United States Patent
Chellappa et al.

(10) Patent No.: US 11,171,953 B2
(45) Date of Patent: Nov. 9, 2021

(54) SECRET SHARING-BASED ONBOARDING AUTHENTICATION

(71) Applicant: HEWLETT PACKARD ENTERPRISE DEVELOPMENT LP, Houston, TX (US)

(72) Inventors: Sharath Srikanth Chellappa, Bangalore (IN); Yashavantha Nagaraju Naguvanahalli, Bangalore (IN); Dileep Bangalore Sridhara, Bangalore (IN); Thomas M. Laffey, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 297 days.

(21) Appl. No.: 16/200,134

(22) Filed: Nov. 26, 2018

(65) Prior Publication Data

US 2020/0059469 A1    Feb. 20, 2020

(30) Foreign Application Priority Data

Aug. 16, 2018 (IN) .............. 2018/41030779

(51) Int. Cl.
*H04L 29/06* (2006.01)

(52) U.S. Cl.
CPC ...... *H04L 63/0876* (2013.01); *H04L 63/0227* (2013.01); *H04L 63/06* (2013.01); *H04L 63/102* (2013.01)

(58) Field of Classification Search
CPC ............ H04L 63/0876; H04L 63/0227; H04L 63/06; H04L 63/102; H04L 63/08; H04L 63/0823; H04L 63/0807; H04L 63/20; G06F 21/44; G06F 21/30
See application file for complete search history.

(56) References Cited

U.S. PATENT DOCUMENTS

| 8,345,861 B2 | 1/2013 | Schneider |
| 9,049,010 B2 | 6/2015 | Jueneman et al. |
| 9,876,768 B2 | 1/2018 | Smith et al. |

(Continued)

OTHER PUBLICATIONS

Github; "Add Support for Public Key Authentication and n-of-m Threshold Scheme #594", Oct. 29, 2015, 4 Pgs.; https://github.com/OpenSC/OpenSC/issues/594.

(Continued)

*Primary Examiner* — Edward Zee
(74) *Attorney, Agent, or Firm* — Trop, Pruner & Hu, P.C.

(57) ABSTRACT

A technique includes receiving a request from a first electronic device to connect to a network and receiving a first part from the first electronic device. The technique includes regulating onboarding of the first electronic device. Regulating the onboarding includes authenticating the first electronic device. Authenticating the first electronic device includes communicating with a plurality of electronic devices that are connected to the network to receive a set of second secret parts; constructing a first secret from the first secret part and the set of second secret parts; and comparing the first secret to a second secret. Regulating the onboarding of the first electronic device includes allowing the first electronic device to connect to the network based on a result of the comparison.

15 Claims, 7 Drawing Sheets

(56) References Cited

U.S. PATENT DOCUMENTS

2007/0094494 A1* 4/2007 Banerjee ............ H04W 12/126
 713/157
2010/0046739 A1* 2/2010 Schneider ............... H04L 9/085
 380/28

OTHER PUBLICATIONS

Xirrus Wi-Fi Networks; "Xirrus Easypass Access Services"; copywright 2015; Retrieved on May 23, 2018, 10 Pgs. http://www.bnw.ch/upload/53/7622/bnw_EasyPass-Solution.pdf.

Adams et al., "Internet X.509 Public Key Infrastructure Certificate Management Protocol (CMP)", Network Working Group, RFC 4210, 2005, 95 pages.

Adi Shamir, "How to Share a Secret", Communications of the ACM, vol. 22, Issue 11, Nov. 1979, pp. 612-613.

Congdon et al., "IEEE 802.1X Remote Authentication Dial In User Service (RADIUS)", Network Working Group, RFC 3580, 2003, 30 pages.

Richardson, "X509.v3 certificate extension for authorization of device ownership", Network Working Group, Internet-Draft, 2014, 8 pages.

* cited by examiner

SECRET SHARING-BASED ONBOARDING AUTHENTICATION

BACKGROUND

A computer system may use a number of different security layers for purposes of preventing a rogue electronic device (a smartphone, a laptop, a tablet computer and so forth) from accessing unauthorized data and/or introducing unauthorized data (malware, for example) into the computer system. In this manner, the computer system may provide a first layer in the form of controlling the onboarding, or connection, of electronic devices to its networks. For example, the onboarding process may involve the computer system authenticating a given electronic device attempting to connect to a network of the computer system for purposes of confirming the identity of the electronic device. Other layers may include, for example, a firewall that enforces access policies, such as the particular services that the network device (and its users) may access through its connection to the network. Another layer may be, for example, anti-virus and/or malware software.

DETAILED DESCRIPTION

For purposes of controlling the onboarding of a particular electronic device, the identity of the electronic device may first be confirmed through a process called authentication. In this context, onboarding refers to the general process of connecting to a network. In general, the network may be a wireless or wired network, and the electronic device may be a mobile electronic device (a smartphone, a wearable device, a laptop computer, a tablet computer, and so forth), as well as a non-mobile electronic device (a desktop computer, a thin client, a network device, such as a switch, and so forth). It is noted that the onboarding refers to the initial connection of the electronic device to the network, and the computer system may employ additional layers to regulate access of the electronic device to resources of the network. In this manner, the network to which the electronic device connects may use such other security control layers, as a firewall, anti-virus software, malware protection software, and so forth. In accordance with some implementations, the network may contain a particular device, such as a network switch, for purposes of controlling the onboarding of a particular electronic device. In this manner, the network switch may employ an authentication process to prevent unauthenticated network devices (i.e., network devices whose identities could not be confirmed) from gaining access to the network. Once an electronic device is authenticated, the onboarding process may, for example, allow the authenticated device to receive an internet protocol (IP) address from a Dynamic Host Configuration Protocol (DHCP) server.

One type of authentication is multiple factor authentication (MFA). In general, MFA refers to a process to confirm the identity of a particular user or electronic device after the device successfully presents two or three pieces of evidence (or factors) to an authentication mechanism. The evidence may be, as examples, knowledge (something that the electronic device and other devices do not know, for example), something that the electronic device possesses (i.e., something that the electronic device presumably has and other electronic devices do not have, for example) or something that is inherent (i.e., something that the electronic device is, for example).

Two-factor authentication (also known as 2FA) is one type of multi-factor authentication. With two-factor authentication, a device's claimed identity may be confirmed based on two of the following factors that are supplied by the device: 1. something the device knows; 2. something that the device has or; 3. something that the device is. The factor of "something the device knows" is a knowledge factor, in that the user proves knowledge of a secret to supply the factor. Examples are, for example, passwords, or answers to questions. The factor of "something that the device has" is a possession factor. Historically, such a possession factor may be a key to a lock. The basic principle is that the key embodies a secret, which is shared between the lock and the key, and the same principle underlines the possession factor authentication in computer systems. A security token is an example of a possession factor. RSA SecurID token is an example of a disconnected token. Disconnected tokens have no connections to the client computer. They typically use a built-in screen to display the generated authentication data, which is manually typed in by the user.

Connected tokens are devices that are physically connected to the computer to be used. Those devices transmit data automatically. There are a number of different types, including card readers, wireless tags and USB tokens. Inherence factors are factors associated with the user, and are usually bio-metric methods, including fingerprint readers, retina scanners or voice recognition.

An example of two factor authentication is the authentication used to authorize the withdrawal of money from an automated teller machine (ATM). The authentication is based on the correct combination of two factors associated with the correct owner of the corresponding bank account: a bankcard, which is something that the user possesses; and a personal identification number (PIN), which is something that the user knows in order for the ATM to authorize the transaction.

The use of multiple authentication factors to prove identity is based on the premise that an unauthorized actor is unlikely to be able to supply all of the authentication factors. If, in an authentication attempt, at least one of the components is missing or supplied incorrectly, then the claimed identity is not established with sufficient certainty, and access to the asset (e.g., a building, or data) being protected by multi-factor authentication then remains blocked. As further examples, the authentication factors of a multi-factor authentication scheme may include: some physical object in the possession of the user, such as a USB stick with a secret token, a bank card, or a key; some secret known to the user, such as a password PIN or transaction authentication number (TAN); some physical characteristic of the user, such as a fingerprint, eye iris, voice, typing speed, or pattern in key press intervals.

Knowledge factors are often used for authentication. In this form, the user is required to prove knowledge of a secret in order to authenticate.

In general, multiple factor authentication may significantly reduce the incidence of online identify theft and other online fraud, because the victim's password is by itself insufficient to give a thief permanent access to their information. However, many multi-factor authentication approaches remain vulnerable to phishing, man-in-the-browser, and man-in-the-middle attacks.

In accordance with example implementations, as described herein, the onboarding of the electronic device to the system's network may be controlled through "zero touch provisioning." In this context, "zero touch provisioning" refers to controlling, or regulating, the onboarding of an electronic device without the use of user-supplied input (such as a password supplied by the user, for example). Instead, the electronic device attempting to onboard may, as an example of zero touch provisioning, provide a digital certificate for one factor of a multiple factor authentication and provide a part key for the second factor of the multiple factor authentication.

In accordance with example implementations that are described herein, a computer system controls the onboarding of an electronic device to the system's network in a process that uses two factor authentication, with the second factor of the authentication being based on secret sharing. With secret sharing, a secret is divided into shares, or parts, called "part keys" herein, and the part keys are distributed among a group of "participants." In this context, a "participant" refers to an entity, such as an electronic device, which may connect to a given network, such that at a given time, a subset of the participants may be connected to the network, and another currently unconnected participant may request to be connected to the network. In general, each participant is distributed its own unique part of the secret, or part key, and some or all of the parts may be used to reconstruct the secret. In other words, when a particular participant is to be authenticated for onboarding, the participant supplies its part key and one or multiple other participants supply their part keys. If the network device performing the authentication is able to construct the secret from the provided part keys, then the participant requesting onboarding is allowed to connect to the network. In accordance with example implementations, relying on all participants to provide the part keys may be impractical, and in lieu of all part keys being used to reconstruct the secret, a threshold scheme is used where any k of n part keys are sufficient to reconstruct the secret.

As a more specific example of the secret sharing used for the second factor of authentication, "S," as used herein, is a number (an integer, for example) and may be viewed as being the numerical representation of a secret, such as a password. The secret may be formed from alphabet characters, numbers, a combination of alphanumeric characters, and so forth. Thus, although the secret is described herein as being numerically represented by the number S, it is understood that the secret the password may include one or multiple numbers and other characters, all numbers, no numbers, and so forth, depending on the particular implementation.

The numerical representation of the secret, S, may be divided into n pieces, or part keys, called $S_1, \ldots, S_n$. It is assumed that there are k points in a two-dimensional plane, each having a coordinate x and a coordinate y, i.e., ($x_i$, and $y_i$) ($x_2$, $y_2$) ... ($x_k$, $y_k$), where i is an index ranging from 1 to k. With the $x_i$ points being distinct, there is only one polynomial q(x) function of degree k−1 such that $(x_i)=y_i$ for all i. Knowledge of any k or more $S_i$ pieces makes the numerical representation of the secret, S, relatively easily computable. Knowledge of any k−1 or fewer $S_i$ pieces leaves S completely undetermined (in the sense that all its possible values seem as likely as they would to somebody with knowledge of zero pieces).

In general, the above-described authentication is referred to herein as a "(k, n) threshold scheme." If k=n, then all participants participate to reconstruct the secret.

In accordance with example implementations, the number k is set sufficiently low such that the number of concurrently connected devices to a network at a given time is expected to be greater than or equal to k. Moreover, the number n may be, for example, equal to or greater than the maximum number of connections that can be formed (the number of maximum connections for a particular network switch, for example). As described further herein, using a two factor authentication scheme, the $S_i$ pieces are distributed to network devices as the network devices initially attempt to connect to the network, and at any given time, a certain number of network devices are connected to the network and are able to provide their corresponding piece $S_i$. As such, when one of the network devices wants to connect to the network, the requesting device may supply its piece $S_i$, and other currently connected network devices may provide their corresponding pieces $S_i$ so that the authenticating device on the network (a switch, for example) may construct S based on the provided pieces $S_i$; and if the representation of the secret that is constructed from the pieces $S_i$ matches S, then the requesting network device is allowed to connect to the network. In accordance with some implementations, the computer system may, from time to time, replace the original secret with a new secret (i.e., replace the numerical representation S of the original secret with a new numerical representation S of a replacement secret), and as such, the computer system may distribute new pieces $S_i$ of the new S.

The (k, n) threshold scheme is based on the premise that an infinite number of polynomials of degree two may be drawn through two points. Three points are sufficient to define a unique polynomial of degree two. In general, the threshold scheme relies on two points being sufficient to define a line, three points being sufficient to define a parabola, four points being sufficient to define a cubic curve, and so forth. That is, k points define a polynomial of degree k−1.

In general, the (k, n) threshold scheme is used to share a secret. Without loss of a generality, it is assumed that the secret s is an element in a finite field F of size P, where 0<k≤n<P; S<P; and P is a prime number. In accordance with example implementations, k polynomial coefficient called "$a_1, \ldots, a_{k-1}$," are determined with $a_i$<P (where "i" represents an index for the coefficients) and $a_0$ (the polynomial constant) being the numerical representation of the secret, S. The polynomial has the following form: "$f(x)=a_0 + a_1x + a_2x^2 + a_3x^3 + a_{k-1}x^{k-1}$."

In general, n points are constructed from the n f(x) polynomials and i=1, ... ak−1,". The prime P is larger than the numerical representation S, the number n of participants and each of the $a_i$ coefficients (including $a_0$=S). Each coordinate may be determined as follows: (i, f(i)mod p). In accordance with example implementations, every device that receives a point also knows the value of the prime number P; and every participant is given a point (a non-zero integer input to the polynomial, and the corresponding integer output) along with the prime number P, which defines the finite field to use. Given any subset of k of these pairs, the coefficients of the polynomials are determined using interpolation. The numerical representation of the secret, S, is the constant term $a_0$.

The following is a more specific example of how the (k, n) threshold scheme may be used to control onboarding of an electronic device to a network. For this example, the numerical representation of the secret, S, is 1695 (i.e., $a_o$=1695). The secret if divided into four shares, or parts. In this manner, the numerical representation S is divided into four parts (n=4), where any three parts (k=3) is sufficient to reconstruct the numerical representation S. At random, two polynomial coefficients $a_1$ and $a_2$ may be determined and may be 36 and 189, respectively. The prime number P for this example is 1823. Thus, the polynomial coefficients for the numerical representation S of 1695 are as follows for this example: $a_0$=1695; $a_1$=36; and $a_2$=189. Moreover, for this example, two coefficients are selected because k=3 and k−1=2.

Accordingly, a polynomial f(x) may be described as follows: $f(x)=1695+36x+189x^2$. Four points $D_{x-1}$ may then be calculated from the polynomial using $D_{x-1}=(x,f(x) \mod P)$: $D_0$=(1,97); $D_1$=(2,700); $D_2$=(3,1681); and $D_3$=(4, 1217). Each participant receives a different single point. Because $D_{x-1}$ is used instead of $D_x$ (i.e., f(0) is the secret) the points start from (1,f(1)) and not (0,f(0)).

In order to reconstruct the numerical representation of the secret, S, any three points are sufficient. For example, consider the following points of the polynomial f(x): $(x_0, y_0)$=(2,700); $(x_1,y_1)$=(3,1681); and $(x_2,y_2)$=(4,1217). The Lagrange basis polynomials may be determined as follows:

$$l_0 = \frac{x-x_1}{x_0-x_1} \cdot \frac{x-x_2}{x_0-x_2} = \frac{x-3}{-1} \cdot \frac{x-4}{-2} = \frac{1}{2}x^2 - \frac{11}{2}x + 6;$$

$$l_1 = \frac{x-x_0}{x_1-x_2} = \frac{x-x_2}{x_1-x_2} = \frac{x-2}{1} \cdot \frac{x-4}{-1} = -x^2 + 6x - 8; \text{ and}$$

$$l_2 = \frac{x-x_0}{x_2-x_0} \cdot \frac{x-x_1}{x_2-x_1} = \frac{x-2}{2} \cdot \frac{x-3}{1} = x^2 - 5x + 6$$

The polynomial f(x) may be calculated from the Lagrange basis polynomials as follows:

$$f(x) = \sum_{j=0}^{2} y_j \cdot l_j(x) = 1695 + 36x + 189x^2$$

Considering that the goal of using polynomial interpolation is to find a constant L(0) (i.e., the numerical representation of the secret, S) in a source polynomial using Lagrange polynomials may not be an efficient approach to determining the constant. Therefore, in accordance with example implementations, the numerical representation S (L(0)) may be determined using the following relationship:

$$L(0) = \sum_{j=0}^{k-1} f(x_j) \prod_{\substack{m=o \\ m \neq j}}^{k-1} \frac{x_m}{x_m - x_j}$$

Figure 1:
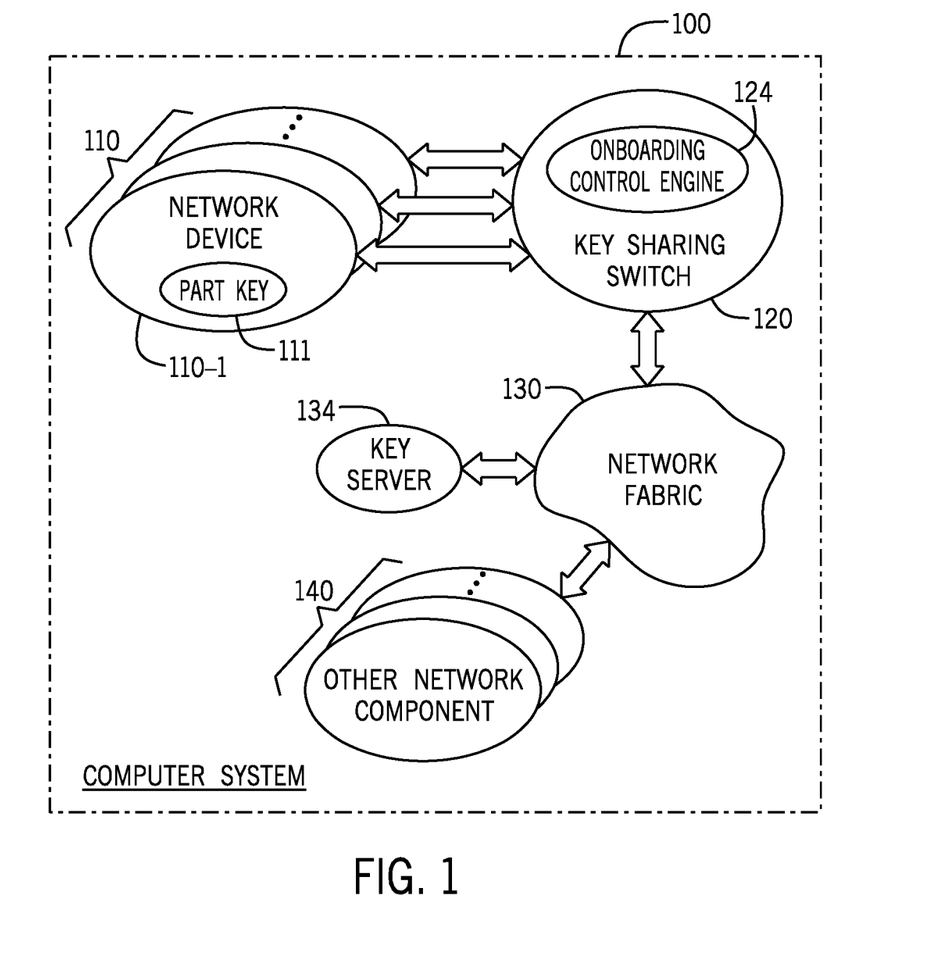
FIG. 1 is a schematic diagram of a computer system that uses secret sharing-based onboarding authentication according to an example implementation.

The computer system 100 may include a component, such as a key sharing network switch 120, for purposes of regulating the onboarding of electronic devices to a network of the computer system 100. This onboarding, in turn, includes the use of the above-described (k, n) threshold scheme for purposes of determining one factor of a multiple factor authentication process. More specifically, as further described herein, in accordance with some implementations, the key sharing switch 120 uses two factor authentication to authenticate an electronic device requesting to onboard a network of the computer system 100. In this two factor authentication, the electronic device provides a digital certificate (an X.509 certificate, such as an IDEVID certificate, for example) for one factor; and the electronic device and one or multiple other devices that are currently connected to the network provide corresponding part keys 111, which are used by the key sharing switch 120 to construct a secret and determine whether the constructed secret matches the switch's stored secret. Although as described herein, a network switch performs the threshold scheme for purposes of authenticating and controlling access to the computer system 100, other components of the computer system 100 may perform the threshold authentication in accordance with further example implementations.

In general, the computer system 100 may be a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

In accordance with some implementations, the computer system 100 may include one or multiple computers, such as one or multiple personal computers, workstations, servers, rack-mounted computers, special purpose computers, and so forth. In accordance with some implementations, the functions of the key sharing switch 120 may be performed by one or multiple of these computers. In accordance with example implementations, one or more of the network devices 110 may be such computers. One or more of these computers may form other network components 140 of the computer system 100, such as components that are permanently connected as part of the computer system 100 and do not undergo the secret sharing-based onboarding as described herein. Moreover, in accordance with some implementations, one or more multiple computers may form a key server 134 that may generate part keys 131 for distribution to the network devices 110 and may store data corresponding to the numerical representation S. In accordance with some implementations, the key server 134 may be part of a particular network device 110, which controls onboarding of electronic devices to the network. For example, the key server 134 may be part of a network switch, which regulates onboarding to the network. In accordance with further example implementations, the key server 134 may be formed from another computer component. For these implementations, the key server may be rigorously secured and may be the strongest protected part of the computer system for purposes of preventing the key server from being hacked.

Depending on the particular implementation, the computers of the computer system 100 may be located at the same geographical location or may be located at multiple geographical locations. Moreover, in accordance with some implementations, the computers may be rack-mounted computers, such as sets of the computers may be installed in the same rack. In accordance with further example implementations, the computer system 100 may include one or multiple virtual machines that are hosted by one or multiple computers.

In accordance with example implementations, the key sharing switch 120 may include an onboarding control engine 124, which controls, or regulates, the onboarding of the network devices 110 using the two factor authentication described herein and more specifically, using the (k, n) threshold scheme that is described herein. In accordance with example implementations, the onboarding control engine 124 may be constructed from one or multiple physical hardware processors, such as one or multiple central processing units (CPUs), one or multiple CPU cores and so forth, which execute machine executable instructions to control the onboarding as described herein. In this manner, the key sharing switch 120 may, in addition to such processor(s), include a memory that stores the machine executable instructions. In accordance with example implementations, the key sharing switch 120 may include one or multiple physical hardware processors 122, such as one or multiple central processing units (CPUs), one or multiple CPU cores, and so forth. In general, the memory is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory may store various data (data representing a prime number, a number k of part keys, temporary coefficient data, a whole or partial polynomial function, temporary variables involved in the reconstruction of polynomials and/or secrets/keys, part keys, and so forth). In accordance with example implementations, the memory may represent part of a memory of a trusted platform module (TPM) of the key sharing switch 120.

In accordance with some implementations, one or more of the components of the onboarding control engine 124 may be implemented in whole or in part by a hardware circuit that does not include a processor executing machine executable instructions. For example, in accordance with some implementations, one or more parts of the onboarding control engine 124 may be formed in whole or in part by a hardware processor that does not execute machine executable instructions, such as, for example, a hardware processor that is formed from an application specific integrated circuit (ASIC), a field programmable gate array (FPGA), and so forth. Thus, many implementations are contemplated, which are within the scope of the appended claims.

In general, the key sharing switch 120 controls the connections of the network devices 110 to network fabric 130 of the computer system 100. In general, the network fabric 130 may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., network fabric communicating Internet traffic), or any combination thereof.

Figure 2:
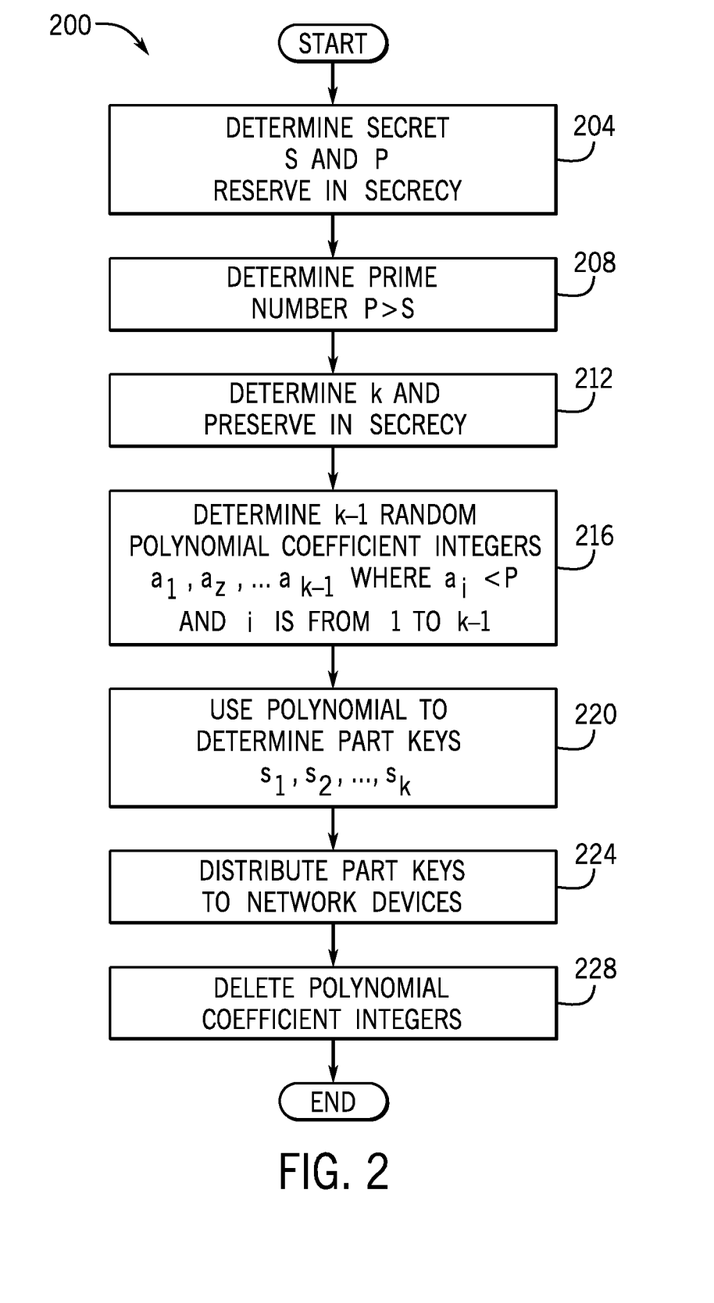
FIG. 2 is a flow diagram depicting a technique to determine part keys according to an example implementation.

FIG. 2 depicts a technique 200 that may be performed by the onboarding control engine 124 for purposes of determining and distributing the part keys according to an example implementation. Referring to FIG. 2 in conjunction with FIG. 1, pursuant to the technique 200, the onboarding control engine 124 determines (block 204) a secret (i.e., determines the numerical representation S) and preserves the secret in secrecy. In other words, data, S, may be stored a trusted memory, such as a memory of a TPM of the onboarding control engine 124. As noted above, in accordance with some implementations, the numerical representation of the secret S may be an integer number. Pursuant to the technique 200, the onboarding control engine 124 may also determine (block 208) a prime number P greater than the secret S. Moreover, pursuant to block 212, the onboarding control engine 124 may determine a number k (i.e., a number equal to or less than n, the number of part keys of the numerical representation S.

Next, pursuant to the technique 200, the onboarding control engine 124 may determine (block 216) k−1 random or pseudorandom polynomial coefficient integers $a_1, a_2, \ldots a_{k-1}$, where the coefficient a is less than the prime number P. Moreover, the subscript index "i" represents a number from 1 to k−1.

In accordance with example implementations, the polynomial coefficient $a_i$ may be a pseudorandomly or randomly generated number, where the number is less than the prime number P. In accordance with example implementations, a "pseudorandom number" may be a nearly random number, and in accordance with example implementations, the onboarding control engine 124 may include a pseudorandom number generator, such as a seed-based generator, which provides a pseudorandom number at its output.

As a more specific example, in accordance with example implementations, the onboarding control engine 124 may include a polynomial-based generator, which provides an output that represents a pseudorandom number, and the pseudorandom number is based on a seed value that serves as an input to a polynomial function. As examples, the seed value may be derived from a state or condition at the time the pseudorandom number is to be generated, such as input provided by real time clock (RTC) value, a counter value, a measured noise value, a register value, and so forth. The polynomial-based generator receives the seed value as an input, applies a polynomial function to the seed value and provides an output (digital data, for example) that represents the pseudorandom number.

In accordance with further example implementations, the onboarding control engine 124 may include a true random number generator, which provides an output that represents a truly random number. For example, the random number generator may include an analog-to-digital converter (ADC) that provides a random digital output; and the ADC may sample a truly random analog signal, such as a thermal noise signal (a Johnson-Nyquist noise signal that is provided by a resistor, for example) or an atmospheric noise signal that is received by an antenna.

Pursuant to block 220, the onboarding control engine 124 uses a polynomial function constructed from the polynomial coefficients to determine the $S_1, S_2, \ldots S_k$ part keys. The onboarding control engine 124 distributes (block 224) the part keys to the network devices 110 that are currently connected to the computer system 100, stores additional part keys used for potential additional network devices 110 to be connected to the future, and then erases, or deletes, the polynomial coefficient integers, pursuant to block 228. In accordance with some implementations, the additional part keys that are currently not assigned to network devices 110 may be stored in a key server 134 of the computer system 100.

Figure 3:
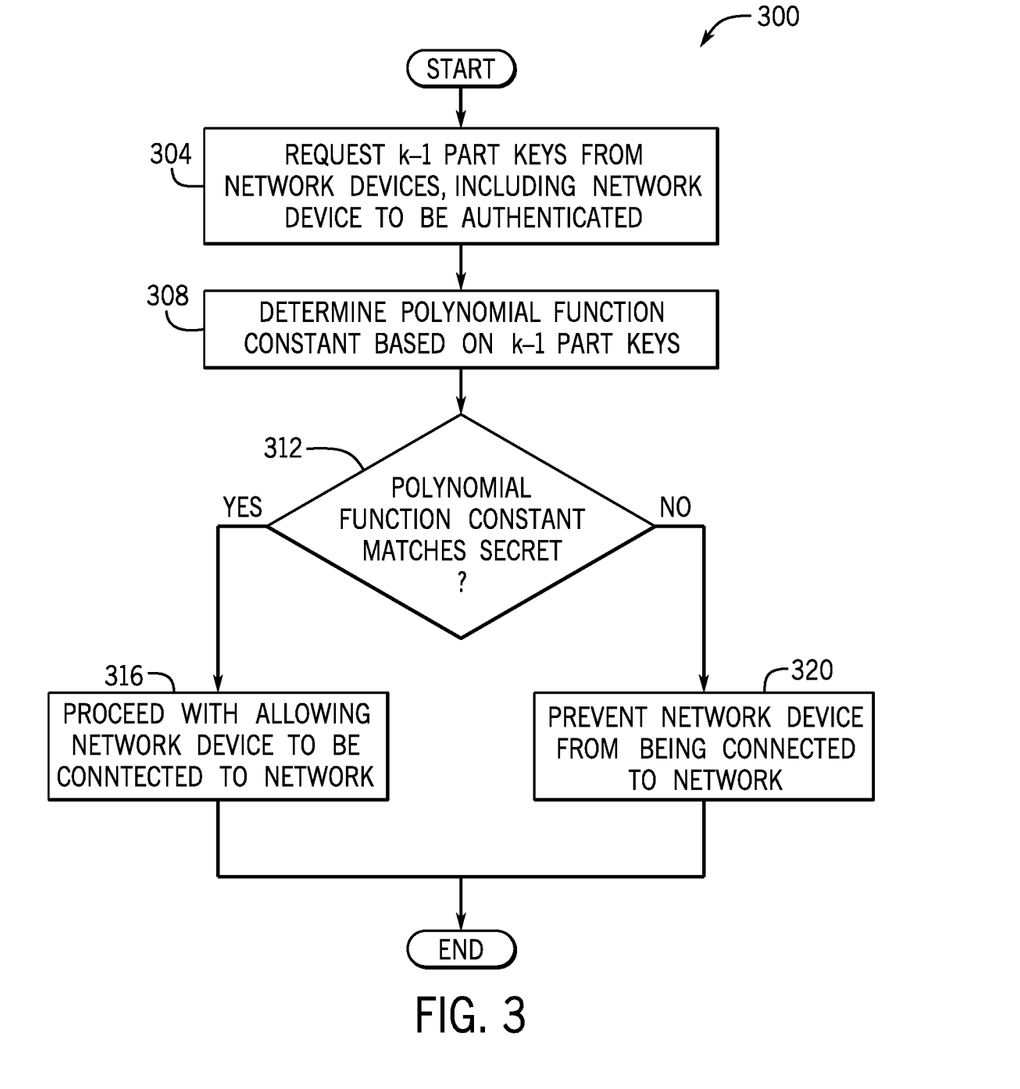
FIG. 3 is a flow diagram depicting a technique to authenticate an electronic device using part keys according to an example implementation.

FIG. 3 illustrates a two part factor authentication that may be performed by the onboarding control engine 124 in accordance with example implementations. Referring to FIG. 3 in conjunction with FIG. 1, pursuant to the technique 300, the onboarding control engine 124 receives (block 302) a request from a network device 110 for onboarding onto a network of the computer system 100 and performs a first part of the two factor authentication. In this manner, in accordance with example implementations, the onboarding control engine 124 may authenticate the network device 110 using PKI. In this manner, the onboarding control engine 124 may authenticate the network device using an IDEVID certificate of the network device 110, and the network device 110 may authenticate the key sharing switch 120 and key server 134 in a similar manner. A secure channel may then be created between the key sharing switch 120 and the network device 110 using either SSH or TLS, for example. In this manner, an ephemeral Diffie-Hellman key exchange may be used to generate a pre-master secret and a pseudorandom function may be used to generate a master secret coupled with rekey to ensure for secrecy. Next, the onboarding control engine 124 performs the second factor of authentication using the part key 111 that is provided by the network device 110.

Pursuant to the technique 300, the onboarding control engine 124 requests (block 304) k−1 part keys from one or multiple network devices 110 that are currently connected to the computer system 100. From these part keys, the onboard control engine 124 may then determine (block 308) a polynomial function constant. If the onboard control engine 124 determines (decision block 312) that the polynomial function constant matches the secret S, then the onboard control engine 124 proceeds with allowing the network device 110-1 to be connected to the network, pursuant to block 316. Otherwise, as depicted in block 320, the onboard control engine 124 prevents the network device 110-1 from being connected to the network.

In accordance with example implementations, the secret sharing authentication described herein allows no-touch authentication and provisioning for network devices and may be particularly advantageous for a network associated with the hospitality industry in which numerous wireless devices are connecting and reconnecting to a wireless network. Moreover, the secret sharing authentication that is described herein may offer a number of additional advantages, such as, for example, a robust secure authentication that may not be broken, even if the adversary had unlimited computing power. In this manner, the adversary simply does not have sufficient information to break the encryption and as such, the authentication scheme is considered cryptanalytically-unbreakable. Also the secret sharing authentication does not reply on unproven assumptions about computational hardness, and such, is not vulnerable to future developments in computer power, such as quantum computing.

The secret sharing authentication scheme is minimal. In this manner, the size of part key does not exceed the size of the original data.

The secret sharing authentication scheme is extensible. In this manner, when k is kept fixed, $D_i$ pieces may be dynamically added or deleted without affecting the other pieces.

The secret sharing authentication scheme is dynamic. In this manner, security may be enhanced without changing the secret, but instead by changing the polynomial occasionally (keeping the same free term), constructing corresponding new shares, and communicating these new shares to the participants.

The secret sharing authentication scheme is safe from masquerading attacks, as multiple such attacks would be on node/part-key switches of the network in order to gain access into the network, as reconstruction of the secret relies on k pieces of the key.

The secret sharing authentication scheme mitigates man-in-the-middle attacks. In this manner, the first part of the two factor authentication prevents an adversary from spying on a secure channel in which the part key is being communicated without knowledge of the private key that is used for the secure channel.

The secret sharing authentication scheme increases the security with increased stakeholders. In this manner, the greater the value of k, the stronger the network design. Hence, this is markedly different from other cryptographic protocols in which security decreases with an increase in the number of stakeholders.

Other and different advantages may be achieved, in accordance with further implementations.

Figure 4:
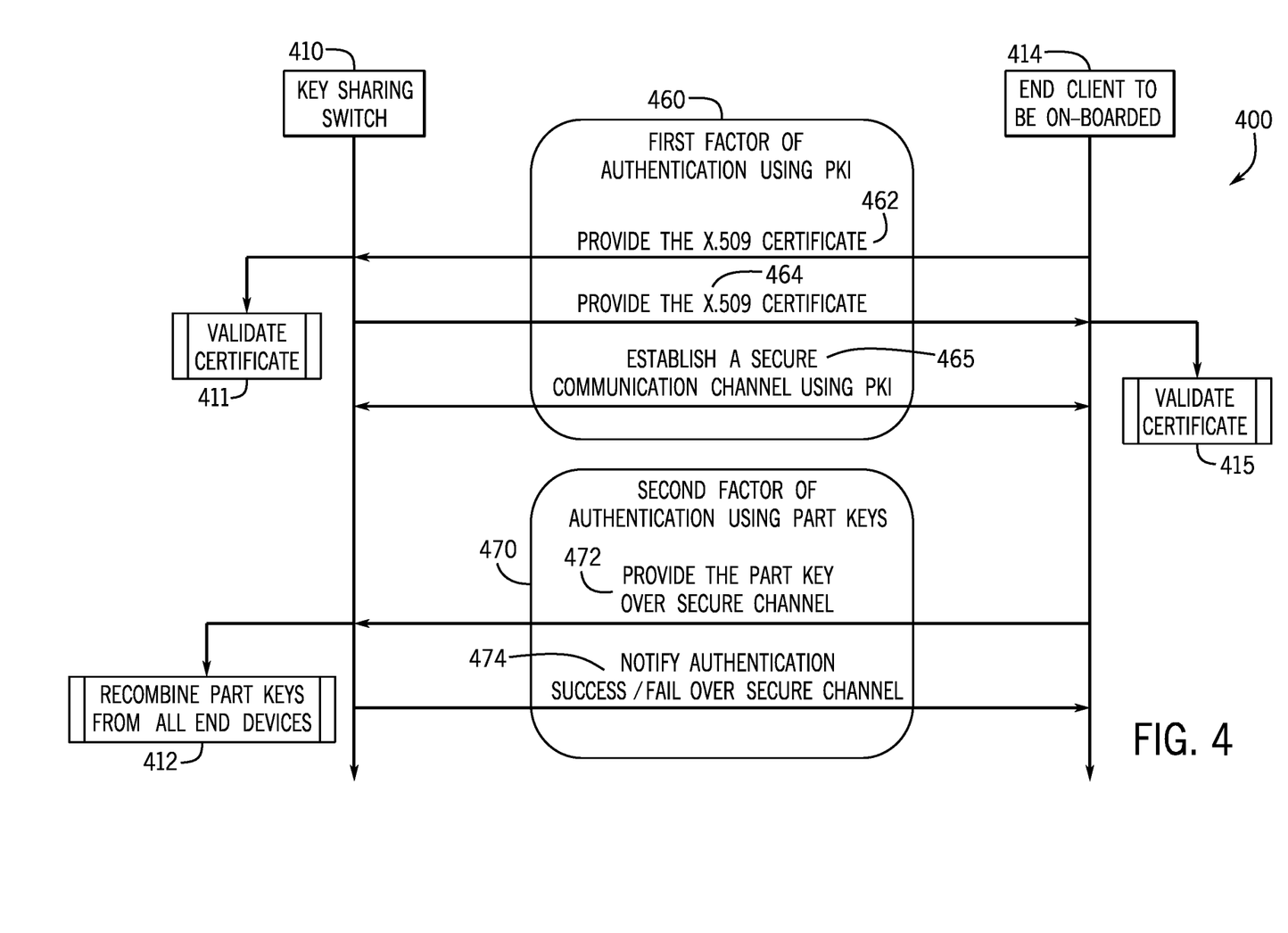
FIG. 4 is a signal flow diagram depicting a technique to use two factor authentication to regulate onboarding of an end client according to an example implementation.

FIG. 4 is an example signal flow diagram 400 illustrating the use of two factor authentication to regulate onboarding of an end client 414 (i.e., an electronic device, such as a network switch, for example), in accordance with example implementations. As depicted in FIG. 4, for this example, the onboarding may be controlled by a key sharing switch 410 and may use zero touch provisioning, such that the end client 414 undergoes an onboarding process that does not use user supplied input (such as a password). More specifically, in accordance with example implementations, to perform a first factor of the authentication, as depicted at reference numeral 460, the end client 414 provides (as depicted at reference numeral 462) a digital certificate, such as a valid X.509 certificate 411, to the key sharing switch 410; and likewise, the key sharing switch 410 provides (as depicted at reference numeral 464) a valid X.509 certificate 415 to the end client 414. Due to this digital certificate exchange, the end client 414 and the key sharing switch 410 mutually authenticate first authentication factors for each other, and due to this mutual authentication, communicate with each other to establish a secure communication channel, using, for example, a public key infrastructure (PKI)-based key exchange, as depicted at reference numeral 465.

Next, as depicted in FIG. 4, the secure communication channel is used for purposes of the end client 414 establishing the second factor of authentication to allow the end client 414 to be onboarded, as generally depicted at reference numeral 470. For this second factor of authentication, the end client 414 first provides its part key over the secure communication channel, as depicted at reference numeral 472; and the key sharing switch 410 recombines this part key with part keys retrieved from one or multiple other end devices (depending on the value of k), as depicted at reference numeral 412. The key sharing switch 410 then, via the secure communication channel, notifies (reference numeral 474) the end client 414 to the success or failure of the end client 414 satisfying the second factor of authentication.

Figure 5:
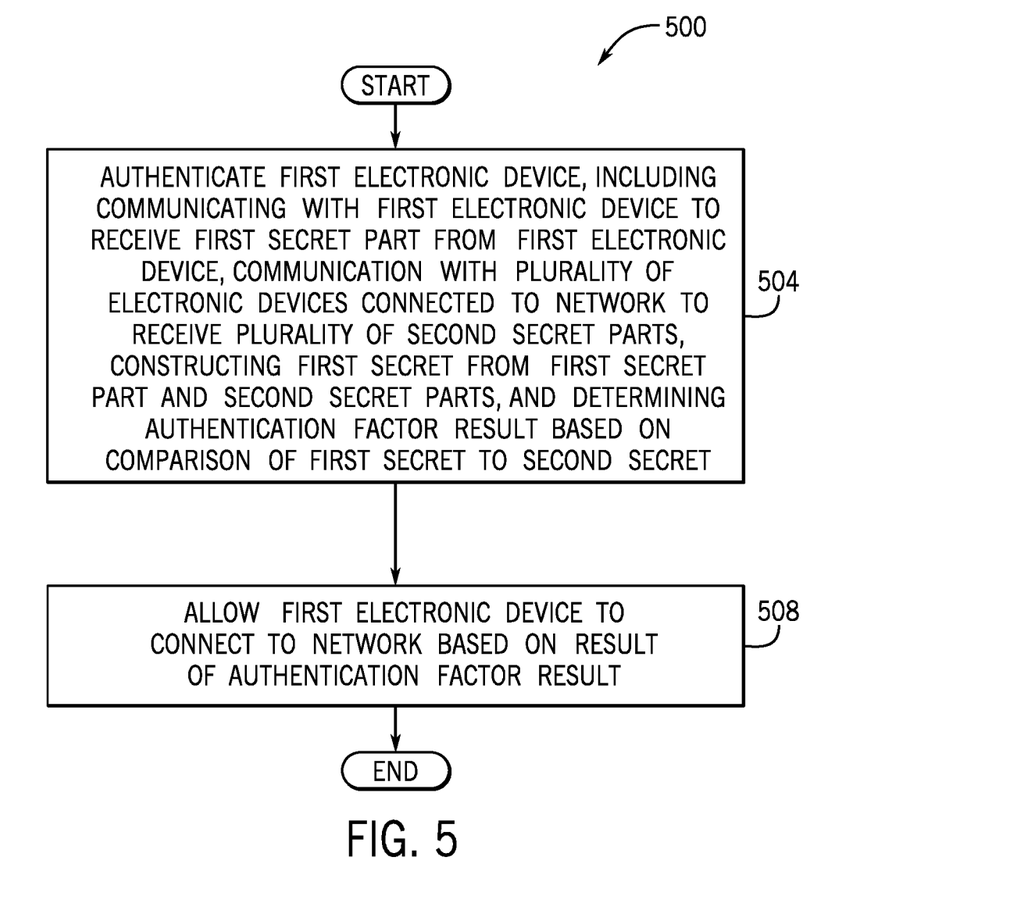
FIG. 5 is a flow diagram depicting a technique to regulate onboarding of an electronic device to a network using secret sharing-based authentication according to an example implementation.

Referring to FIG. 5, in accordance with example implementations, a technique 500 includes receiving (block 505) a request from a first electronic device to connect to a network and receiving a first secret part from the first electronic device. The technique 500 includes controlling (block 508) onboarding of the first electronic device. Controlling the onboarding includes authenticating (block 512) the first electronic device including communicating with a plurality of electronic devices connected to the network to receive a second set of secret parts; constructing a first secret from the first secret part and the second set of secret parts; and comparing the first secret to a second secret. Controlling the onboarding, pursuant to block 508, further includes allowing (block 516) the first electronic device to connect to the network based on the result of the comparison.

Figure 6:
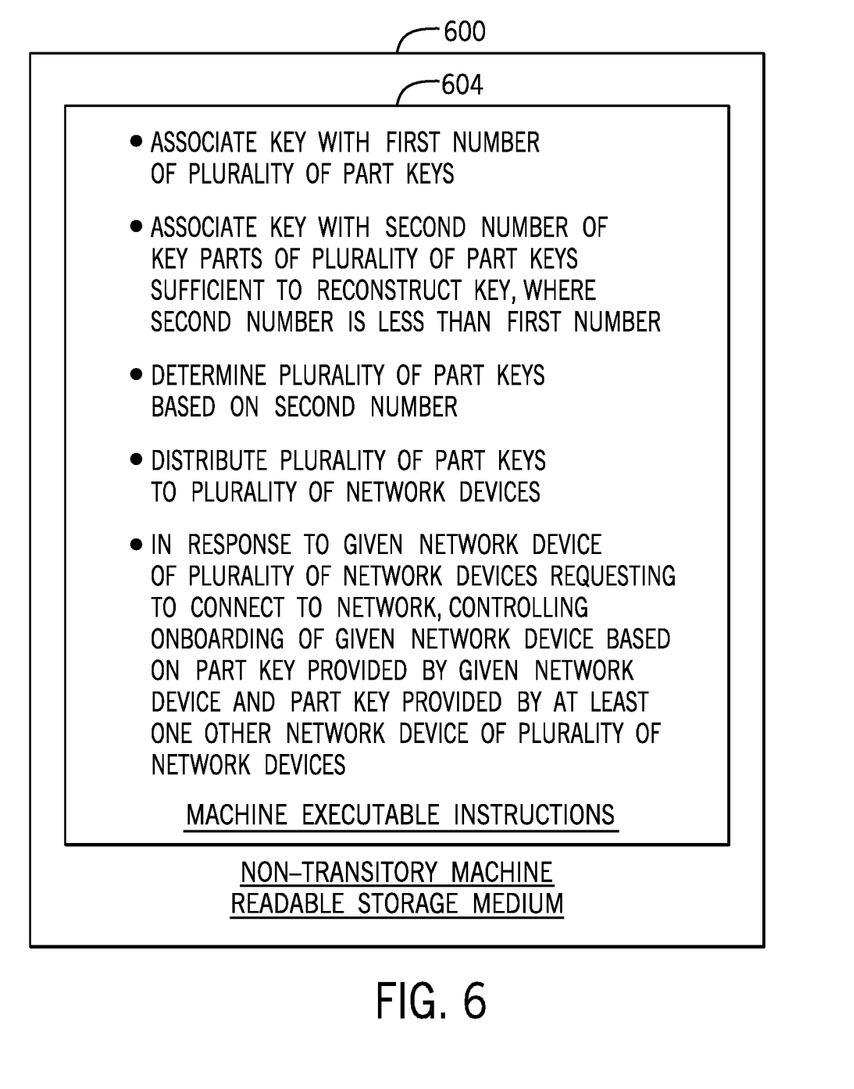
FIG. 6 is an illustration of machine executable instructions to authenticate a network device based on a part key provided by the network device according to an example implementation.

Referring to FIG. 6, in accordance with example implementations, a non-transitory machine readable storage medium 600 stores machine executable instructions 604 that, when executed by a machine, cause the machine to associate a key with a first number of a plurality of part keys; associate the key with a second number of key parts of the plurality of part keys sufficient to reconstruct the key, wherein the second number is less than the first number; determine the plurality of part keys based on the second number; distribute the plurality of part keys to a plurality of network devices of a network; and in response to a given network of the plurality of network devices requesting to connect to the network, controlling onboarding of the given network device based on a part key provided by the given network device.

Figure 7:
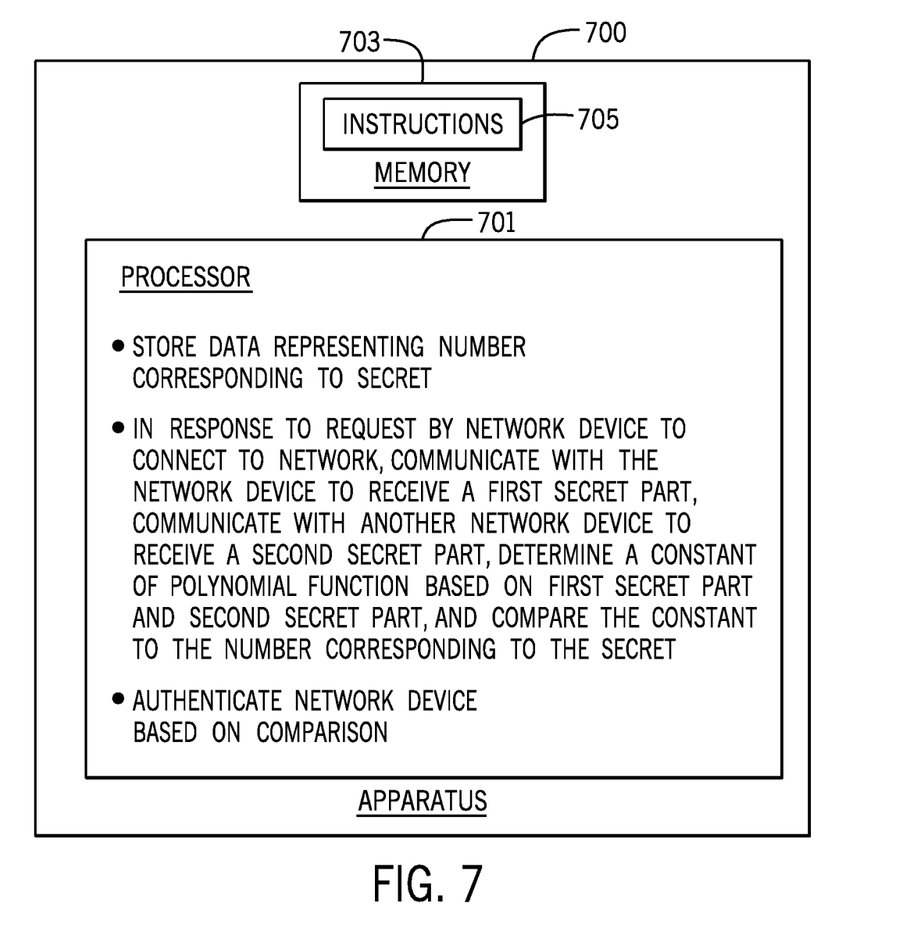
FIG. 7 is a schematic diagram of an apparatus to control onboarding of a network device using secret sharing-based authentication according to an example implementation.

Referring to FIG. 7, in accordance with example implementations, an apparatus 600 includes a processor 701; and a memory 703. The memory 703 stores instructions 705 that, when executed by the processor 701, cause the processor 701 to store data representing a number corresponding to a secret. The instructions, when executed by the processor, cause the processor to, in response to a request by a network device to connect to a network, communicate with the network device to receive a first secret part; communicate with another network device to receive a second secret part; determine a constant of a polynomial function based on the first secret part and the second secret part; compare the constant to the number corresponding to the secret; and authenticate the network device based on the comparison.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A non-transitory machine readable storage medium storing instructions, that, when executed by a machine, cause the machine to:
associate a key with a first number of a plurality of part keys;
associate the key with a second number of key parts of the plurality of part keys sufficient to reconstruct the key, wherein the second number is less than the first number;
determine the plurality of part keys based on a polynomial function and based on a degree of the polynomial function of the second number;
determine random or pseudo random coefficients of the polynomial function, and use the polynomial function to generate a plurality of pairs of coordinates, wherein each pair of coordinates of the plurality of pairs of coordinates corresponds to a part key of the plurality of part keys distributed to a plurality of network devices;
use an integer less than or equal to a second predetermined number as a first coordinate of a given pair of coordinates of the plurality of pairs of coordinates;
apply the polynomial function to the integer to generate a polynomial function output value;
determine a remainder produced by dividing the output value by a prime number; and
use the remainder as a second coordinate of the given pair of coordinates,
distribute the plurality of part keys to the plurality of network devices of a network; and
in response to a given network device of the plurality of network devices requesting to connect to the network, controlling onboarding of the given network device based on a part key provided by the given network device.

2. The storage medium of claim 1, wherein the storage medium stores instructions that, when executed by the machine, cause the machine to preserve the second number in secrecy in a memory of the machine to prevent the second number from being known outside of the machine.

3. The storage medium of claim 1, wherein:
the key comprises the first number; and
the storage medium stores instructions that, when executed by the machine, cause the machine to determine the plurality of part keys based on a polynomial function and a prime number greater than the first number.

4. The storage medium of claim 1, wherein the storage medium stores instructions that, when executed by the machine, cause the machine to perform a two factor authentication in which the machine requests a digital certificate from the given network device, establishes a secure communication channel in response to receiving the digital certificate associated with a first factor of the two factor authentication, and uses the secure communication channel to receive the part key from the given network device in association with a second factor of the two factor authentication.

5. The storage medium of claim 1, wherein the storage medium stores instructions that, when executed by the machine, cause the machine to distribute another plurality of part keys to the plurality of network devices to rekey the plurality of network devices.

6. A method comprising:
associating a key with a first number of a plurality of part keys;
associating the key with a second number of key parts of the plurality of part keys sufficient to reconstruct the key, wherein the second number is less than the first number;
determining the plurality of part keys based on a polynomial function and based on a degree of the polynomial function of the second number;
determining random or pseudo random coefficients of the polynomial function, and using the polynomial function to generate a plurality of pairs of coordinates, wherein each pair of coordinates of the plurality of pairs of coordinates corresponds to a part key of the plurality of part keys distributed to a plurality of network devices;
using an integer less than or equal to a second predetermined number as a first coordinate of a given pair of coordinates of the plurality of pairs of coordinates;
applying the polynomial function to the integer to generate a polynomial function output value;

determining a remainder produced by dividing the output value by a prime number; and using the remainder as a second coordinate of the given pair of coordinates, distributing the plurality of part keys to the plurality of network devices of a network; and in response to a given network device of the plurality of network devices requesting to connect to the network, controlling onboarding of the given network device based on a part key provided by the given network device.

7. The method of claim 6, comprising:
preserving the second number in secrecy in a memory to prevent the second number from being known outside of a machine performing the method.

8. The method of claim 6, wherein the key comprises a third number, the method comprising:
determining the plurality of part keys based on a polynomial function and a prime number greater than the third number.

9. The method of claim 6, comprising:
performing a two factor authentication including requesting a digital certificate from the given network device, establishing a secure communication channel in response to receiving the digital certificate associated with a first factor of the two factor authentication, and using the secure communication channel to receive the part key from the given network device in association with a second factor of the two factor authentication.

10. The method of claim 6, comprising:
distributing another plurality of part keys to the plurality of network devices to rekey the plurality of network devices.

11. An apparatus comprising:
a processor; and
a memory to store instructions that, when executed by the processor, cause the processor to:
associate a key with a first number of a plurality of part keys;
associate the key with a second number of key parts of the plurality of part keys sufficient to reconstruct the key, wherein the second number is less than the first number;
determine the plurality of part keys based on a polynomial function and based on a degree of the polynomial function of the second number;

determine random or pseudo random coefficients of the polynomial function, and use the polynomial function to generate a plurality of pairs of coordinates, wherein each pair of coordinates of the plurality of pairs of coordinates corresponds to a part key of the plurality of part keys distributed to a plurality of network devices;

use an integer less than or equal to a second predetermined number as a first coordinate of a given pair of coordinates of the plurality of pairs of coordinates;

apply the polynomial function to the integer to generate a polynomial function output value;

determine a remainder produced by dividing the output value by a prime number; and use the remainder as a second coordinate of the given pair of coordinates, distribute the plurality of part keys to the plurality of network devices of a network; and in response to a given network device of the plurality of network devices requesting to connect to the network, controlling onboarding of the given network device based on a part key provided by the given network device.

12. The apparatus of claim 11, wherein:
the processor preserves the second number in secrecy in a memory of a machine to prevent the second number from being known outside of the machine.

13. The apparatus of claim 11, wherein:
the key comprises a third number; and
the processor determines the plurality of part keys based on a polynomial function and a prime number greater than the third_number.

14. The apparatus of claim 11, wherein:
the processor performs a two factor authentication in which a machine requests a digital certificate from the given network device, establishes a secure communication channel in response to receiving the digital certificate associated with a first factor of the two factor authentication, and uses the secure communication channel to receive the part key from the given network device in association with a second factor of the two factor authentication.

15. The apparatus of claim 11, wherein:
the processor distributes another plurality of part keys to the plurality of network devices to rekey the plurality of network devices.

\* \* \* \* \*